Patented Jan. 6, 1948

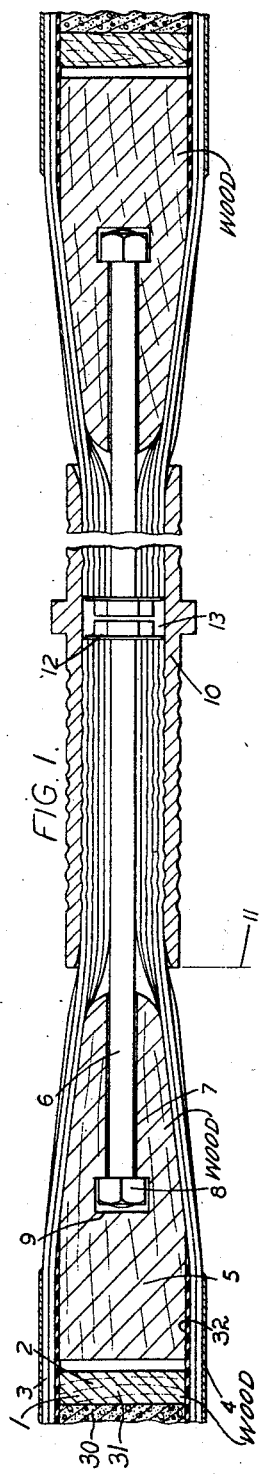
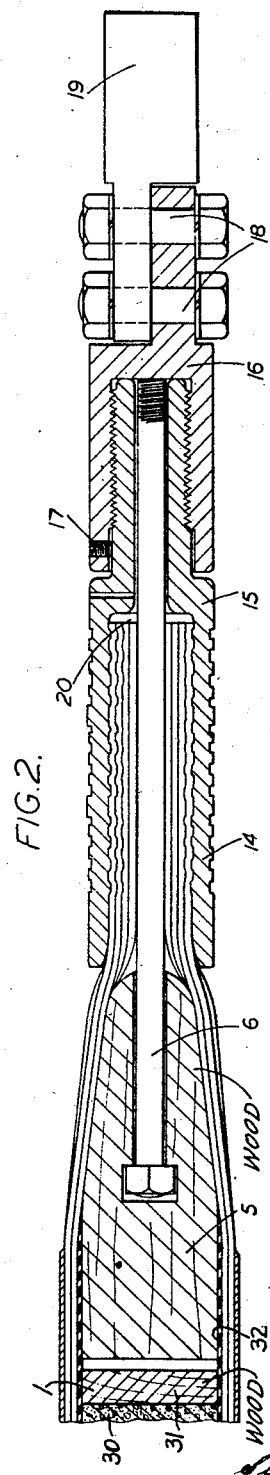
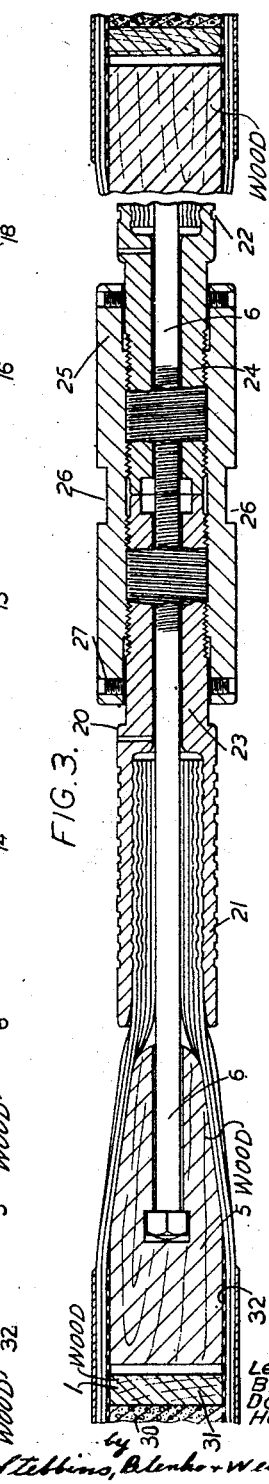

2,433,980

UNITED STATES PATENT OFFICE 2,433,980

COUPLING FOR CABLES

Leslie Giddens Brazier and Douglas Taft Hollingsworth, London, England, assignors, by mesne assignments, to British Insulated Callender's Cables Limited, London, England, a company of Great Britain Application May 16, 1944, Serial No. 535,802
In Great Britain April 30, 1943

Section 1, Public Law 690, August 8, 1946
Patent expires April 30, 1963

6 Claims. (Cl. 174—94)

This invention relates to a coupling for application to the end of a cable formed of wires of ductile metal, for instance aluminium or copper, comprising a sleeve or socket (hereinafter referred to as a sleeve) of ductile metal within which the wires are gripped by forcing in the wall of the sleeve so as to compress the wires out of their normal shape. Such a coupling is referred to herein as of the compressed sleeve type. The coupling to which the invention applies is for use with a type of cable in which the wires are stranded as a hollow cylinder enclosing a separate centre part which is not carried into and through the coupling. In such a case the wires, when bunched together for insertion in the coupling sleeve, form a group of substantially smaller diameter than when they lie in their normal positions in the cable. An object of the invention is to provide a coupling for such conditions which avoids the production of a place of weakness in the cable just outside the sleeve.

In the improved coupling the space of truncated conical form lying within the wires as they are brought down from the diameter which they occupy in the cable to the diameter which they occupy in the coupling sleeve is taken up mainly by a filler block shaped to fit within the space and having a rounded end adjacent the coupling.

This filler block is connected with a rod which extends from the block axially and passes through the bunch of wires and is held there. By this rod the block is secured in the correct relation to the mouth of the sleeve. Its rounded end then lies a short distance axially outside the mouth of the sleeve and this mouth is rounded off. The arrangement thus provides that the wires are held between the mouth of the sleeve and the filler block with sufficient firmness to prevent undue flexing of the wires.

The block is necessarily inserted in place before the wires are brought down to the smaller diameter and bunched for insertion in the sleeve. The adjustment of the position of the filler block longitudinally is carried out before the wall of the sleeve is compressed. When this operation takes place it forces the wires within the sleeve to press upon the rod and bite into the rod, if of ductile metal, and hold the rod and thereby hold the block in the position into which it has been adjusted relative to the sleeve so that the support of the wires given by the block is maintained.

The invention will be further described by the aid of the accompanying drawings, the three figures of which show in longitudinal section three examples.

Figure 1 shows a permanent joint between two lengths of cable;
Figure 2 shows a joint between a length of cable and a terminal member; and
Figure 3 shows a disconnectible joint which may be applied to two lengths of cable.

In each of these cases the cable to be coupled comprises a centre part 1 surrounded by a ring of wires 3 which is enclosed in a flexible covering 4, for instance of rubber or of rubber reinforced with canvas. The centre 1 may consist of lengths of flexible material, such as cellular rubber 30, alternating with discs 31 of more rigid material, such as wood, covered by a tubular skin 32 of rubber. This centre part terminates at the point 2 and the wires 3 are gradually brought inwards and bunched together to form a group to lie within the coupling sleeve. This arrangement provides that there is a space of approximate truncated conical form between the point 2 where the centre part of the cable ends and the region where the wires are bunched together. In accordance with the invention this space is occupied by block 5 of rigid material, for instance wood, which is engaged by a rod 6 and held in place thereby. The engagement between the rod 6 and the block 5, in the examples illustrated, is effected by passing the rod 6 through a central longitudinal hole 7 in the narrower end of the block and screwing it into a nut 8 which lies within a cavity 9 formed in the block and accessible from one or both sides. This cavity is so dimensioned that, while the nut can be inserted readily from the side it cannot turn in the block. The end of the rod is threaded to engage the nut and is screwed thereinto after being passed into the hole 7.

In the permanent joint shown in Figure 1, the two cable lengths to be connected are identical in structure and, as will be seen, the figure is symmetrical about a central vertical line. The coupling member is the sleeve 10. In making this joint the first step is to remove the outer covering of the wires from the end portion of each length of cable and to take out the end portions of the centre part of each length of cable. The wires are then cut to the desired length and the filling block 5 with the rod 6 in position is inserted in the cable end. This rod 6 is screw-threaded at its outer end. The ends of the wires 3 are then closed round the rod 6, being bunched together into a compact cylinder. In doing this the two layers of wire, which are found in the cable, have to be rearranged so as to make a greater number of layers to occupy the space round the rod 6 and form a cylindrical group which will be a good fit within the end of the sleeve 10. In the drawing 5 layers are shown in the bunch.

After the wires have been arranged as described, they are held in position by temporary clips; one placed so as to have its front edge at the line 11 at which the sleeve 10 will terminate when in final position and one or more between this point and the end of the wires. Over the end of the rod 6, which projects from the bunch of wires, is now applied a washer 12 and then a nut 13 is screwed on to the end of the rod. The nut is tightened up so as to draw forward the rod 6 with the block 5 until the latter occupies the position shown in the drawing in relation to the line 11. After this has been done the clip nearest the end of the bunch of wires is removed and the sleeve 10 is pushed over this end and advanced towards the line 11. During this advancing any intermediate clip or clips which may have been provided is or are removed and finally the sleeve is brought into or near the position shown in the drawing on one end of cable, say the end shown at the left-hand side of the drawing. The clip at the line 11 is then removed.

The sleeve 10 when applied has a smooth cylindrical surface, both internally and externally. After application to the bunch of wires it is caused to grip these wires by having a number of circumferential grooves forcibly pressed in its outer surface so as to produce a series of local reductions of the diameter of the inside of the sleeve. This is accompanied by a compacting of the bunch of wires by forcing the individual wires out of their circular shape into some more or less polygonal form in cross-section, thereby substantially eliminating the interstices between the wires. One manner in which this may be done is described in the specification of application No. 515,324 for a patent of the United States of America. During this process of consolidation the wires are caused to grip the rod 6 and thereby ensure its retaining its position and holding the block 5 in place without assistance from the nut 13.

After this attachment of the sleeve 10 to one cable end the process can be repeated for the second cable end so that finally the resulting joint indicated in Figure 1 is attained. The cable joint will generally be completed by the application of an appropriate covering of insulating material, but this has not been shown as it forms no part of the present invention.

It will be seen that in the final positions all the parts of the wires at the mouths of the sleeve 10 are held in position between this sleeve and the rounded end of the adjacent blocks 5 and are thereby supported so that any substantial concentration of bending at this point is prevented. The coupling arrangement shown in Figure 2 is the same as that shown in Figure 1, as far as the left-hand half of the figure is concerned. The coupling sleeve 14 terminates in a reduced screw-threaded end 15. Accordingly, the rod 6 is made of such a length that it extends not only through the bunched wires within the sleeve 14, but also through the central bore in the reduced end 15 of this sleeve. The final pulling up of the block 5 into position by the rod 6 is carried out after the sleeve 14 has been slipped over the bunched wires and before the sleeve is pressed on to the wires. This pulling up is done by a screw-threaded end of the rod 6 which then projects beyond the end of the part 15. For this pulling up, a washer and nut are fitted on the end of the rod and are retained there until the rod has been gripped by the compression of the sleeve 14; then the nut and washer are removed and the end of the rod 6 is cut off flush with the end of the part 15. The socket member 16 is then screwed over the reduced end part 15 and secured in position by the grub screw 17. This part 16 serves as a terminal member to which can be connected by the bolts 18 any desired part, for instance a socket shown at 19.

To facilitate the fitting of the sleeve 14 over the bunched wires and to secure good contact between the individual wires and between the wires and the sleeve the bunched wires are coated with petroleum jelly, or similar lubricant. The hole 20 is provided in the sleeve 14 to permit the escape of surplus lubricant during the compression of the sleeve and the accompanying consolidation of the wires.

The coupling shown in Figure 3 provides two similar half-couplings for the adjacent ends of cable lengths and a third coupling member by which the end parts of these two half-couplings are releasably joined together. The coupling sleeves 21 and 22 have reduced end portions, 23 and 24 respectively. The attachment of the cable end to each of these sleeves 21 and 22 is carried out in the way described in connection with Figure 2, the nuts being removed from the rods 6 and the ends of these rods being cut off flush with the ends of the reduced portions 23 and 24. The joining together of the two lengths of cable is effected by means of the screw-threaded sleeve 25. The end 23 of the sleeve 21 has a left-hand thread and the end 24 of the sleeve 22 has a right-hand thread and the two halves of the sleeves 25 are correspondingly threaded so that rotation of the sleeve relative to the two cable ends draws these ends together into the final position shown in Figure 3. For this rotation the sleeve 25 may be engaged by a spanner on flats shown at 26. The sleeve may be secured in position by grub screws 27.

What we claim as our invention is:

1. A method of making a cable joint using a coupling of the compressed sleeve type for the conductor of an electric cable of the kind in which the wires form a hollow cylinder round a separate centre part, comprising inserting a conoidal filling block with a rod extending axially therefrom in the space within the wires, closing the wires down round the block and rod to lie closely on the rod with the diameter over the wires substantially smaller than in the cable, drawing the block endwise into position by manipulating an end of the rod which projects beyond the ends of the wires, applying the coupling sleeve over the wires and rod up to the neighbourhood of the end of the block but not over the block and compressing the said sleeve and thereby consolidating the bunched wires and causing them to grip and hold the rod.

2. A method of making a cable joint using a coupling of the compressed sleeve type for the conductor of an electric cable of the kind in which the wires form a hollow cylinder round a separate centre part, comprising inserting a conoidal filling block with a rod extending axially therefrom in the space within the wires, closing the wires down round the block and rod to lie closely on the rod with the diameter over the wires substantially smaller than in the cable, applying temporary clips round the wires where they are closed down round the rod, then drawing the block endwise by manipulating an end of the rod projecting beyond the ends of wires, then removing the clips progressively starting from the ends of the wires and at the same time applying the coupling sleeve over the wires and rod up to the neighbourhood of the end of the block but not over the block, then compressing the sleeve and thereby consolidating the wires within it and causing them to grip and hold the rod.

3. A method of making a cable joint using a coupling of the compressed sleeve type for the conductor of an electric cable of the kind in which the wires form a hollow cylinder round a separate centre part, comprising inserting a conoidal filling block with a rod extending axially therefrom in the space within the wires, closing the wires down round the block and rod to lie closely on the rod with the diameter over the wires substantially smaller than in the cable, inserting the rod with the wires closed down round it into the coupling sleeve so that the sleeve is near to but does not cover the conoidal block and so that an end of the rod projects beyond the wires and the outer end of the sleeve, drawing the block endwise into position by manipulating the projecting end of the rod and compressing the sleeve thereby consolidating the bunched wires and causing them to grip and hold the rod.

4. In a cable joint embodying a coupling of the compressed sleeve type for the conductor of an electric cable of the kind in which the wires form a hollow cylinder round a separate centre part and the centre part terminates before the coupling and the wires are bunched together to a smaller diameter for insertion in the coupling sleeve, a conoidal filling block lying within the ring of wires and between the end of the centre part of the cable and the bunched wires and outside said sleeve and a rod engaging the said block and extending through the bunched wires and held therein by the compression of the sleeve thereby securing the said block in supporting position for the wires at the mouth of the sleeve.

5. A cable joint, embodying a coupling of the compressed sleeve type, between two lengths of an electric cable of the kind in which the wires form a hollow cylinder round a separate centre part and the centre part terminates before the coupling and the wires of each of the two lengths are bunched together for insertion in opposite ends of a coupling sleeve, the said joint comprising in each cable end a conoidal filling block lying within the ring of wires and between the end of the centre part and the bunched wires and outside said sleeve, a rod engaging the said block and extending through the bunched wires with a screwed end projecting beyond them and a nut on said end and a sleeve surrounding the two sets of bunched wires and the rods and nuts and gripping and holding the said parts as the result of the compression thereof.

6. A cable joint, embodying a coupling of the compressed sleeve type, for the conductor of an electric cable of the kind in which the wires form a hollow cylinder round a separate centre part and the centre part terminates before the coupling and the wires are bunched together to a smaller diameter for insertion in the coupling sleeve, the said joint comprising a conoidal filling block lying within the ring of wires and between the end of the centre part of the cable and the bunched wires and outside said sleeve, a rod engaging the said block and extending through and beyond the bunched wires, a coupling sleeve having in its length a compressed part and an uncompressed part, the wires and rod lying within the compressed part and being held thereby and the projecting end of the rod passing through the uncompressed part for the full length thereof.

LESLIE GIDDENS BRAZIER.
DOUGLAS TAFT HOLLINGSWORTH.

REFERENCES CITED

The following references are of record in the file of this patent:

UNITED STATES PATENTS

| Number | Name | Date |
|---|---|---|
| 1,973,322 | Staples | Sept. 11, 1934 |
| 1,980,426 | Noyes | Nov. 13, 1934 |
| 2,239,026 | Wagner | Apr. 22, 1941 |
| 943,168 | Shufflebottom et al. | Dec. 14, 1909 |

FOREIGN PATENTS

| Number | Country | Date |
|---|---|---|
| 194,851 | Great Britain | Mar. 22, 1923 |